E. EASTON & J. SCOTT.
Winker-Strap for Bridle-Blinds.

No. 168,241. Patented Sept. 28, 1875.

UNITED STATES PATENT OFFICE.

EDGAR EASTON AND JAMES SCOTT, OF JACKSONVILLE, ILLINOIS.

IMPROVEMENT IN WINKER-STRAPS FOR BRIDLE-BLINDS.

Specification forming part of Letters Patent No. 168,241, dated September 28, 1875; application filed August 16, 1875.

*To all whom it may concern:*

Be it known that we, EDGAR EASTON and JAMES SCOTT, of Jacksonville, in the county of Morgan and State of Illinois, have invented certain new and useful Improvements in Winker-Straps for Bridle-Blinds; and we do hereby declare that the following is a full, clear, and exact description thereof, which will enable others skilled in the art to which it pertains to make and use the same, reference being had to the accompanying drawing and to the letters of reference marked thereon, which form a part of this specification, in which—

Figure 1:
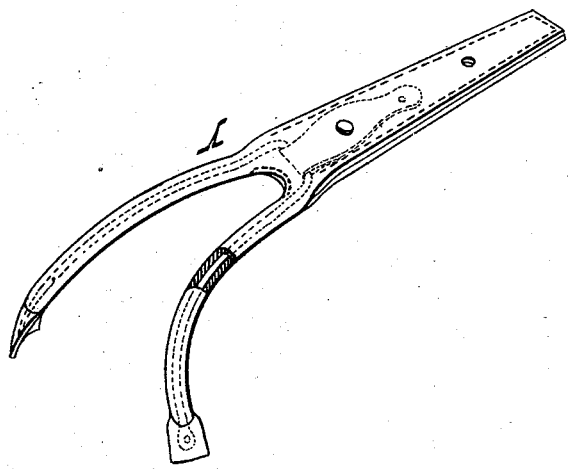
Figure 2:
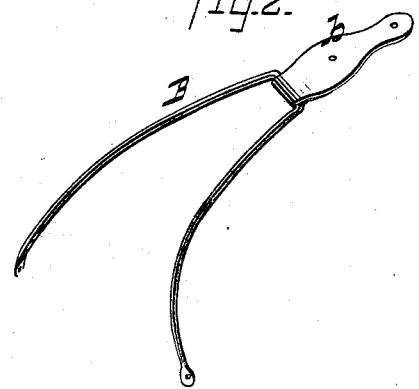

Figure 1 is a perspective view of our improved winker-strap for bridle-blinds; and Fig. 2 is a corresponding detached view of the forked or bifurcated wire with which the strap, as indicated in dotted lines in Fig. 1, is re-enforced.

Corresponding parts in the two figures are denoted by like letters.

This invention relates to a certain improvement in winker-straps for bridle-blinds, its object being to prevent the latter flapping or striking the horse in the eyes, and to adapt it to suit the size of the horse's face. It consists of a bifurcated or forked strap re-enforced by wire and a plate, substantially as hereinafter more fully set forth.

In the annexed drawing, A refers to a Y-shaped or bifurcated winker-strap for bridle-blinds, one end of which is susceptible of attachment, with the aid of a buckle, &c., to the bridle. Its bifurcated or forked portion is re-enforced with wire B, preferably of malleable or other ductile metal, and provided with a plate, *b*, riveted or otherwise fastened to the strap A to retain the said wire in place. The ends of the bifurcated or forked portion of the strap and wire are adapted for attachment to the bridle-blinds as shown or otherwise. The re-enforcement of the strap A with the wire B imparts a stiffness thereto that will retain its arms or prongs firmly in position, by which the blinds to which they are attached are prevented from flapping or striking the horse or animal in the eyes. It will also be observed that by reason of the malleability or ductility of the wire B the strap can be adapted to suit the size of the horse's face by simply bending or curving it to conform thereto.

Having thus described our invention, what we claim, and desire to secure by Letters Patent, is—

The bifurcated or forked winker-strap A for bridle-blinds, re-enforced with wire B, having the plate *b*, substantially as and for the purpose set forth.

In testimony that we claim the foregoing as our own we hereunto affix our signatures in presence of two witnesses.

EDGAR EASTON.
      JAMES SCOTT.

Witnesses:
 EDWARD LAMBERT,
 W. H. THOMPSON.